(12) United States Patent
Glatt (10) Patent No.: US 7,742,070 B2
(45) Date of Patent: Jun. 22, 2010

(54) PANORAMIC CAMERA

(76) Inventor: Otto Gregory Glatt, 4 Crown Point, Ballston Lake, NY (US) 12019

( * ) Notice: Subject to any disclaimer, the term of this patent is extended or adjusted under 35 U.S.C. 154(b) by 76 days.

(21) Appl. No.: 12/114,807

(22) Filed: May 4, 2008

(65) Prior Publication Data

US 2009/0213208 A1  Aug. 27, 2009

Related U.S. Application Data

(63) Continuation-in-part of application No. 12/035,404, filed on Feb. 21, 2008.

(51) Int. Cl.
*H04N 7/00* (2006.01)
(52) U.S. Cl. ........................................... 348/36
(58) Field of Classification Search ........................ None
See application file for complete search history.

(56) References Cited

U.S. PATENT DOCUMENTS 5,198,267 A * 3/1993 Aharoni et al. ............. 427/162
5,373,392 A * 12/1994 Bala ........................... 359/241
6,262,760 B1 * 7/2001 Glassman et al. ............. 348/36
6,850,025 B1 * 2/2005 Paolantonio et al. ........ 318/685
2007/0139792 A1 * 6/2007 Sayag ......................... 359/739
2007/0259117 A1 * 11/2007 Archey et al. ............... 427/337

* cited by examiner

*Primary Examiner*—Nhon T Diep
(74) *Attorney, Agent, or Firm*—Michael R. Kahn (57) ABSTRACT

An improved camera for the acquisition of panoramic images is disclosed. The camera comprises a convex photochromic reflector directed towards an image capture element. Multiple incoming light sensors around the perimeter of the camera detect strong incoming light and cause the activation of a corresponding UV light. The UV light in turn activates the photochromic effect on a particular region of the photochromic reflector that corresponds to an area of strong incident light. The photochromic reflector then darkens in that area, providing compensation for a scene that has a wide range of lighting conditions. Therefore, the camera compensates for strong lighting indoors as well as outdoors.

17 Claims, 8 Drawing Sheets

PANORAMIC CAMERA

CROSS-REFERENCE TO RELATED APPLICATIONS

This application is a continuation-in-part of U.S. patent application Ser. No. 12/035,404 (Panoramic Image Management System and Method), filed on Feb. 21, 2008.

FIELD OF THE INVENTION

The present invention generally pertains to surveillance systems. More particularly, the present invention pertains to imaging systems for the panoramic surveillance of a space using a single, stationary camera.

BACKGROUND

Panoramic cameras provide a convenient way to capture a 360 degree field of view with a single camera. Cameras of this type are very useful for surveillance and security applications. Such systems are disclosed in U.S. Pat. No. 7,071,964 (360-Degree Panoramic Scene-Storage Device), and U.S. patent application Ser. No. 12/035,404 (Panoramic Image Management System and Method). Both of these references are incorporated herein by reference, to the extent not inconsistent with this disclosure. Exposure control with cameras of this type can be quite difficult, as there are a variety of lighting conditions, and usage scenarios (e.g. indoor, outdoor, night use) that should be considered for optimal performance. As there is an ever increasing need for security and surveillance, it is desired to have an improved camera for the acquisition of panoramic images in the aforementioned usage scenarios.

SUMMARY OF THE INVENTION

The present invention provides for an improved camera for the acquisition of 360 degree panoramic images. The camera comprises a convex photochromic reflector disposed at one end of a generally cylindrical housing. The photochromic reflector is directed towards an image capture element (such as a CCD array) at the other end of the housing. The photochromic reflector darkens when exposed to light in the ultraviolet range. For example, sunlight during times where the sun is low in the sky (e.g. early morning or late afternoon) causes the photochromic reflector to darken in the area where the sunlight illuminates the reflector. On the opposite side, not exposed to sun, the photochromic effect does not substantially darken the reflector on that side. The net effect is to direct a light-compensated image into the image capture element.

The photochromic effect works well in outdoor situations, where sunlight is the primary light source that needs to be accounted for to maintain proper exposure. However, indoors, an artificial light source may not emit sufficient UV light to trigger the photochromic effect. Various indoor lights have UV filters. Furthermore, many home and building windows filter out substantial UV light. In the case of a 360 degree security camera mounted indoors, yet near a window, it is possible that ambient sunlight may enter the camera, yet the UV components may be filtered out, and therefore does not invoke the desired photochromic effect.

To accommodate these situations, the present invention provides a plurality of UV lights disposed around the photochromic reflector. There are also multiple light sensors around the exterior of the camera. When a light sensor detects light above a predetermined intensity level, the corresponding UV light is activated. This causes the photochromic effect to occur in the area where the incident light is received, and creates the desired photochromic effect in that area. A radial mirror (a mirror in the form of a ring that goes around the reflector, and is angled towards the reflector) serves to direct as much of the UV light as possible onto the photochromic reflector, to help maximize the photochromic effect. Therefore, the camera compensates for strong lighting indoors as well as outdoors.

The light sensors may include both visible light sensors, and infrared light sensors. For night operations, a plurality of IR (infrared) lights may be disposed around the perimeter of the camera, directed outward toward the area being viewed by the camera. Corresponding IR sensors detect IR light (either reflected light, or light from external IR sources) and activate the appropriate UV light, if too high in intensity, to cause the darkening of the photochromic reflector in the desired area.

To provide for additional darkening, the housing may also be comprised of a photochromic material. In this embodiment, there is a "double" photochromic effect, from both the housing and the reflector. This provides for more compensation in extra bright situations.

In another embodiment, heating elements are disposed to prevent icing of the camera during cold weather operations. In yet another embodiment, a dew point temperature is calculated from temperature, humidity, and barometric pressure sensors that are on the camera housing. The heating elements are activated to warm the photochromic housing and photochromic reflector when the ambient temperature falls below a predetermined value (e.g. freezing temperature, or a calculated dew point temperature). This maintains the camera temperature above the dew point temperature, and avoids condensation on the optical components such as the reflector or housing.

These advantages, along with others, will be further elaborated upon in the detailed description and drawings that follow.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

In the drawings accompanying the description that follows, in some cases both reference numerals and legends (labels, text descriptions) may be used to identify elements. If legends are provided, they are intended merely as an aid to the reader, and should not in any way be interpreted as limiting.

DETAILED DESCRIPTION

Figure 1:
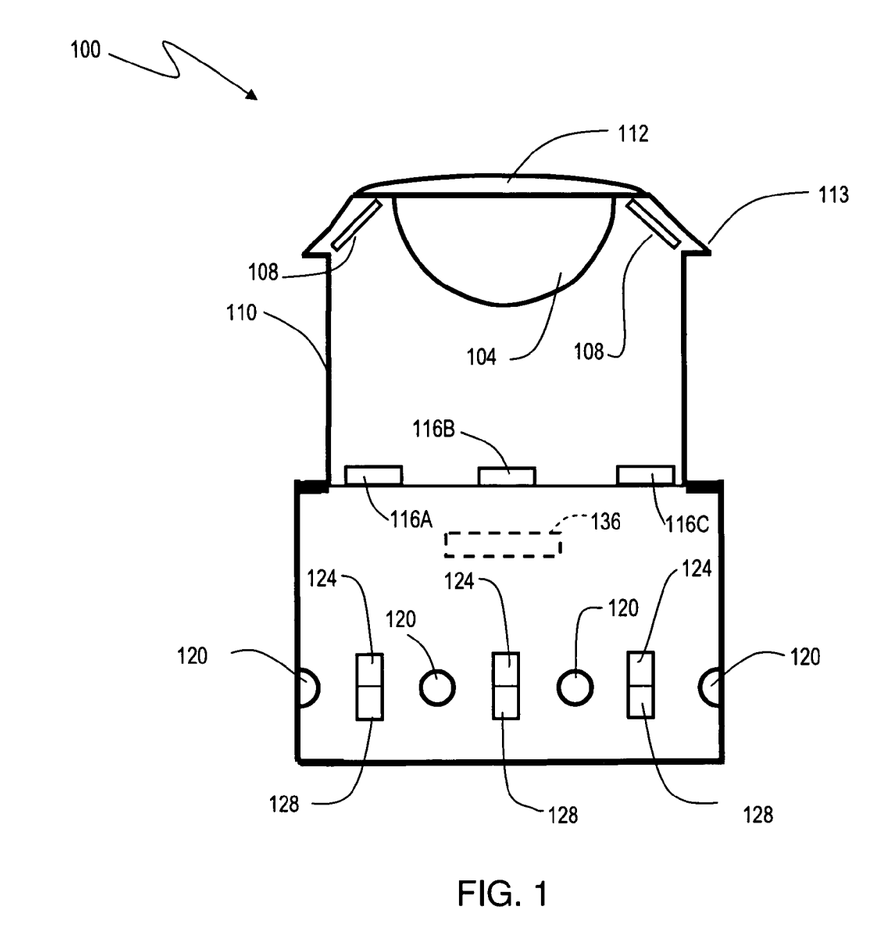
FIG. 1 shows a side view of a camera in accordance with an embodiment of the present invention.
Figure 2:
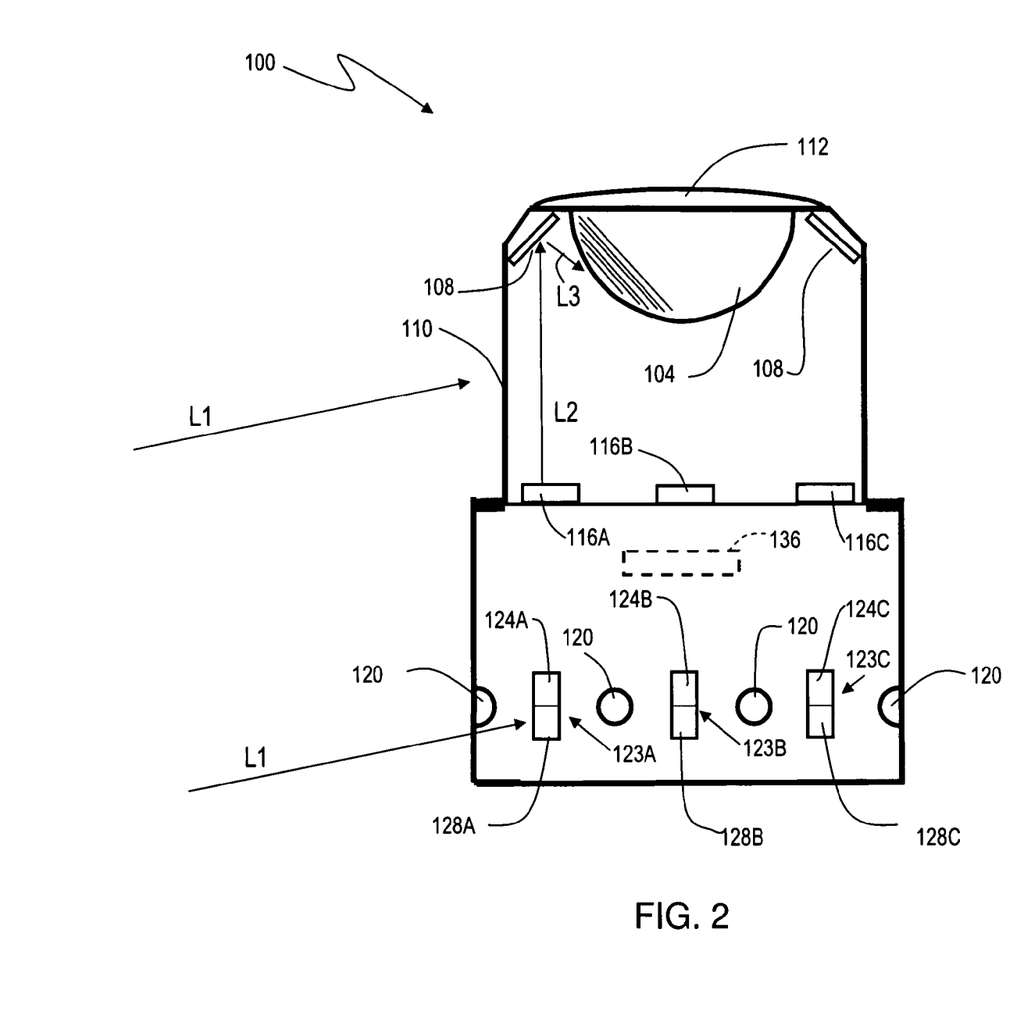
FIG. 2 shows a side view of the camera of FIG. 1 during operation.

FIG. 1 and FIG. 2 show a side view of a camera 100 in accordance with an embodiment of the present invention. The camera 100 comprises an optical housing 110 that is substantially transparent. A photochromic reflector 104 is disposed at the top of the housing, and configured to reflect the light from a 360 degree field of view around the camera to an image capture element 136 located within the base of the camera. Top cover 112 provides an overhang 113 that extends beyond the circumference of the optical housing 110 and circumscribes it, so as to block the overhead sun's rays from going directly into the camera. Radial mirror 108 serves to direct UV light from light sources 116 onto the reflector 104.

Around the exterior of camera 100 are a plurality of UV (ultraviolet) lights 116A-116C that are directed at photochromic reflector 104. This enables the photochromic reflector 104 to be darkened in a particular direction as needed, providing additional control of the photochromic properties. Camera 100 further comprises a plurality of IR (infrared) light sources (indicated generally as 120) that emit infrared light towards the scenes that camera 100 captures. Camera 100 further comprises a plurality of light sensor modules 123. Sensor module 123A comprises a visible light sensor 124A and infrared light sensor 128A, and is configured and disposed to trigger an activation of a corresponding UV light source 116 when excess light (either infrared or visible) is detected. The other sensor modules (e.g. 123B, 123C, etc. . . . ) operate in a similar manner to sensor module123A.

FIG. 2 shows a side view of the camera 100 of FIG. 1 during operation. In this figure, visible light rays L1 illuminate one side of the camera. Light rays L1 illuminate camera 100, and are received by visible light sensor 128A, causing UV light 116A to emit light rays L2, which spread about 25° and are directed toward the reflector 104. Any rays that miss the reflector are reflected off radial mirror 108 onto the reflector 104 so as to gather all the UV rays possible. The reflected light rays (indicated as L3) illuminate a portion of the photochromic reflector 104, which darkens accordingly, thereby maintaining appropriate exposure control for image capture element 136.

Figure 2A:
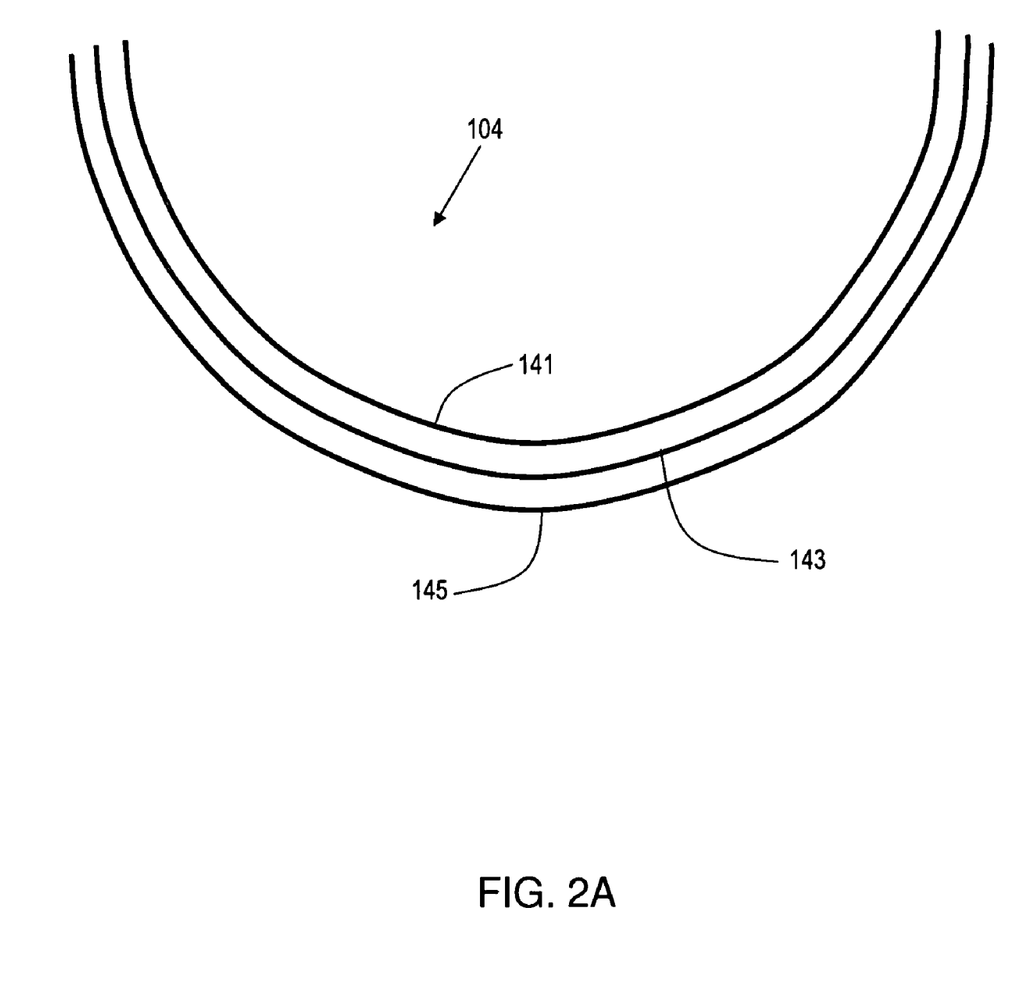
FIG. 2A shows a detailed view of an embodiment of a photochromic reflector.

FIG. 2A shows a particular photochromic reflector embodiment, in which photochromic reflector 104 is hemispherical, and comprised of an acrylic "half-ball" 141 that has a mirror coating 143 applied to it, and a photochromic coating 145 applied on the mirror coating 143.

Figure 3:
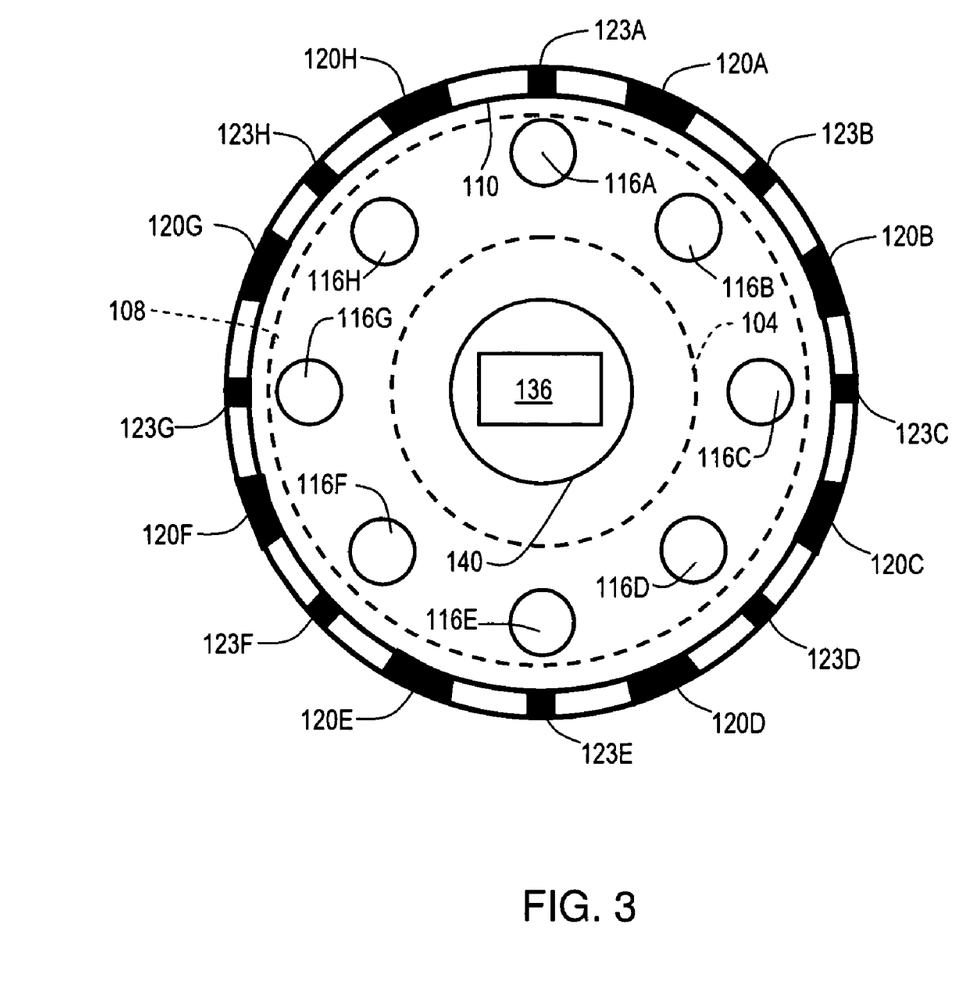
FIG. 3 shows a top-down view of a camera in accordance with an embodiment of the present invention.

FIG. 3 shows a top-down view of the camera shown in FIG. 1. In this view, the positional relationship of each UV light 116, sensor module 123, and infrared light 120 is shown. For example, if sensor modules 123B and 123C detect an excess amount of infrared or visible light, then UV lights 116B and 116C will be activated, reflecting off radial mirror 108, and illuminating only a portion of photochromic reflector 104. This will help maintain acceptable exposure levels in image capture element 136. This is important in a 360 degree view camera, as there are many situations where there is intense light illuminating the camera from one side only (e.g. at sundown), which causes a disparity amongst different parts of the image captured by image capture element 136. By employing a photochromic reflector 104, and using the UV light sources to trigger the photochromic effect within the reflector 104, this exposure problem is overcome.

Antireflection tube 140 surrounds image capture element 136 and shields it from stray reflections, to avoid corruption of the captured image. Antireflection tube 140 is preferably of a matte black finish to minimize any stray reflections that reach image capture element 136.

Photochromic reflector 104 darkens when exposed to UV light. However, it is possible to have bright light in situations where the UV is largely filtered out. For example, many modern windows filter out UV light. A 360 degree panoramic camera mounted indoors near such a window may be exposed to bright sunlight, especially in early morning or late afternoon. However, as the UV light is filtered out by the windows, the photochromic effect would not be sufficient to improve the exposure. However, with the present invention, the UV lights 116 effectively "restore" the UV light that has been filtered out, thereby allowing the photochromic effect to occur sufficiently enough to darken photochromic reflector 104, and maintain proper exposure in image capture element 136.

Figure 4:
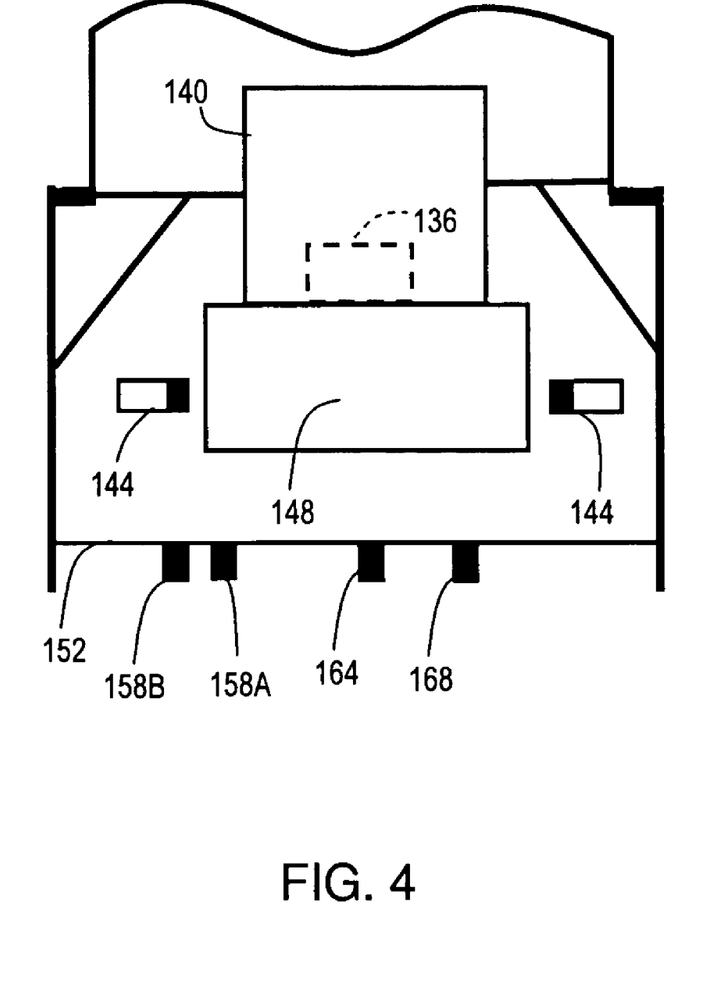
FIG. 4 shows a cutaway side view of the bottom section of a camera in accordance with an embodiment of the present invention.

FIG. 4 shows a cutaway side view of the bottom section of a camera in accordance with an embodiment of the present invention. Antireflection tube 140 shields image capture element 136 from stray reflection, to avoid corruption of the captured image. Image capture element 136 is mounted on camera body 148, which houses additional electronics and/or optical components. Heating elements 144 serve to prevent frost from forming on the camera housing, reflector, and other components. In one embodiment, the heating elements 144 are activated by a temperature control circuit (not shown) when the ambient temperature falls below a predetermined level, such as 32 degrees Fahrenheit. The heating elements 144 serve to maintain the camera temperature above its lower operational temperature-limit and also serve as a deicer and defroster. In one embodiment, an adjustable bimetal strip is used as a controller for closing an electrical circuit.

Figure 4A:
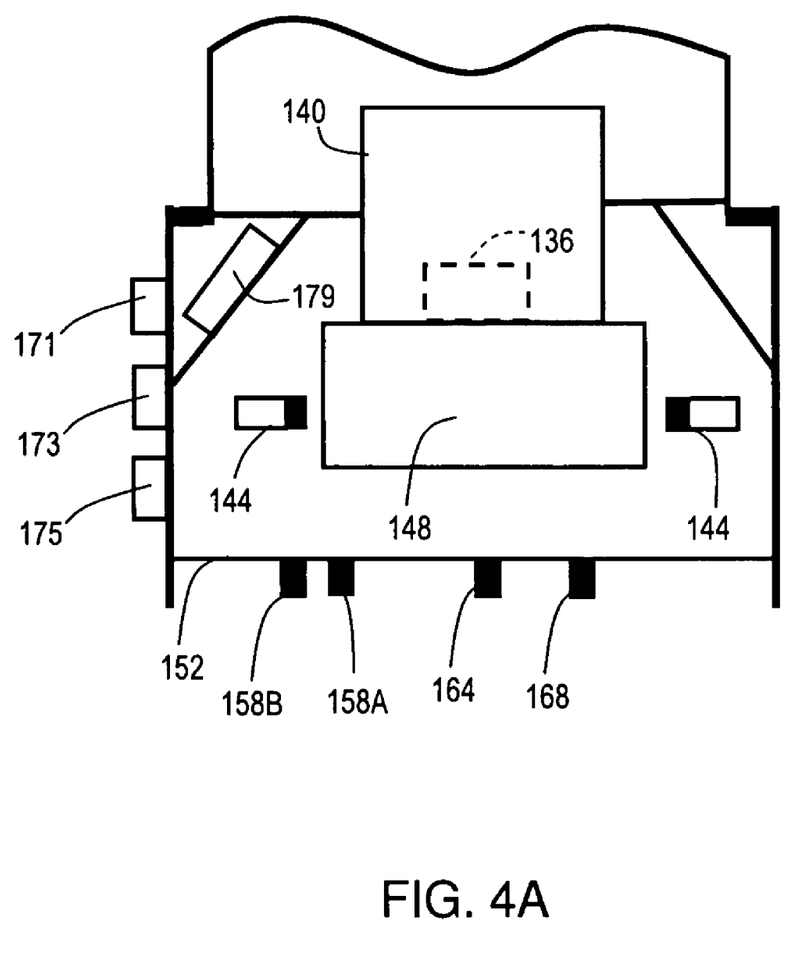
FIG. 4A shows a cutaway side view of the bottom section of a camera in accordance with an alternative embodiment of the present invention.

FIG. 4A shows an alternative embodiment, in which the heating elements 144 may also serve as part of an anti-condensation system. In this embodiment, in addition to considering the ambient temperature, the relative humidity and barometric pressure may also be considered, to calculate a dew point temperature. The heating elements are then activated as necessary to maintain the camera temperature above the dew point temperature, thereby preventing condensation on the housing 110 or reflector 104. In one embodiment, a microcontroller 179 on board the camera 100 reads input from ambient temperature sensor 171, ambient relative humidity sensor 173, and ambient barometric pressure sensor 175, and computes a dew point temperature value, and activates heating elements 144 to maintain the air temperature of the camera above the dew point temperature value. The internal implementation for the dew point calculation may be performed via formula, which is well known, or alternatively, the dew point may be approximated via a lookup table. In this case, it is possible to make an assumption about the pressure, and avoid the need for barometric pressure sensor 175.

At the bottom of the camera is switch plate 152, which is recessed slightly from the base, allowing for access to controls 158A, 158B, 164, and 168. These controls are explained further in the discussion of FIG. 5

Figure 5:
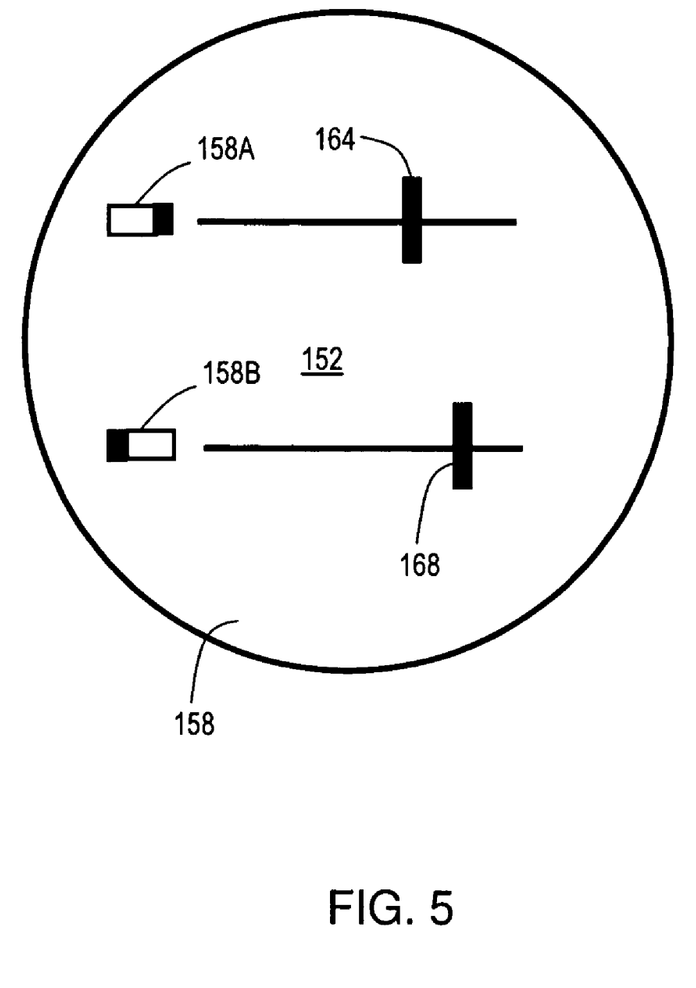
FIG. 5 shows a view of the underside of the base of a camera in accordance with an embodiment of the present invention.

FIG. 5 shows a view of the underside of the base of a camera in accordance with an embodiment of the present invention. In this view, visible sensor enable control 158A, IR sensor enable control 158B, visible sensitivity control 164, and IR sensitivity control 168 are shown. The visible sensor enable control 158A is a switch that enables the triggering of the UV lights 116 based on visible light detected. Visible sensitivity control 164 allows the setting of an activation point which corresponds to the amount of visible light required to trigger the UV lights. The IR sensor enable control 158B is a switch that enables the triggering of the UV lights 116 based on IR light detected. IR sensitivity control 168 allows the setting of an activation point which corresponds to the amount of IR light required to trigger the UV lights.

Figure 6:
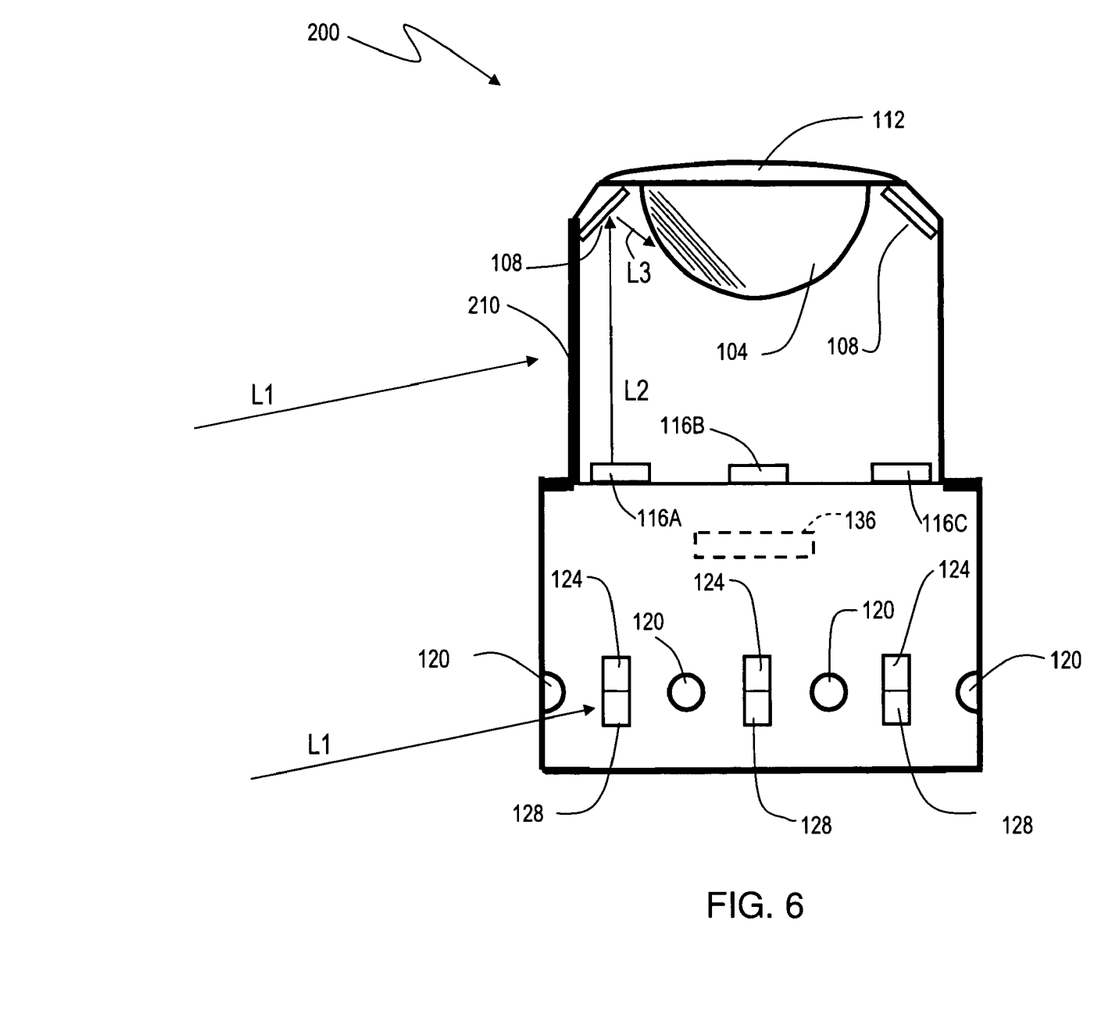
FIG. 6 shows an alternative embodiment of a camera of the present invention.

FIG. 6 shows an alternative embodiment of a camera 200 of the present invention. This embodiment is similar to camera 100 that is illustrated in FIG. 1. The additional element in this embodiment is a photochromic housing 210 in place of the optical housing 110 that is used in the camera 100 shown in FIG. 1. In this case, the photochromic housing 210 provides an additional level of darkening than with using only a photochromic housing or photochromic reflector. Furthermore, the placement of UV lights 116 allows them to illuminate both photochromic reflector 104, and photochromic housing 210. Thereby providing more exposure compensation capability, for situations where the incident light rays L1 are particularly intense (e.g. very bright sunlight, or artificial lights).

Although the description above contains many specific details, these should not be construed as limiting the scope of the invention, but merely as providing illustrations of some of the presently preferred embodiments of the present invention.

What is claimed is:

1. A camera for acquiring a 360 degree panoramic image, the camera comprising:
    a generally cylindrical housing, said housing allowing light to pass through it
    a top cover, said top cover disposed at a first end of said housing;
    a photochromic reflector, said photochromic reflector disposed with said housing, below said top cover; and
    an image capture element, said image capture element disposed at a second end of said housing, wherein the photochromic reflector is a hemispherical photochromic reflector, and wherein the photochromic reflector is comprised of an acrylic half-ball, the acrylic half-ball having a mirror coating disposed thereon, and
    a photochromic coating disposed on the mirror coating, and further comprising:
    a plurality of sensor modules disposed around the exterior of the camera; and
    a plurality of light sources disposed around the exterior of the camera, wherein each light source corresponds to a sensor module, and each light source is configured to illuminate the photochromic reflector upon activation of the corresponding sensor module.

2. The camera of claim 1, wherein the plurality of light sources are ultraviolet light sources.

3. The camera of claim 1, wherein each of the plurality of sensor modules comprises an infrared light sensor, and a visible light sensor.

4. The camera of claim 3, further comprising a plurality of infrared light sources disposed around the exterior of the camera, and configured to illuminate outward from the camera.

5. The camera of claim 3, further comprising means for setting an activation point for the infrared sensor.

6. The camera of claim 3, further comprising means for setting an activation point for the visible light sensor.

7. The camera of claim 3, further comprising means for disabling an activation point for the infrared sensor.

8. The camera of claim 3, infrared light sensor, further comprising means for disabling an activation point for the visible light sensor.

9. The camera of claim 1, wherein said top cover further comprises an overhang, said overhang extending beyond the circumference of said housing, and circumscribing said housing.

10. The camera of claim 1, further comprising an antireflection tube, said antireflection tube surrounding said image capture element, thereby reducing stray reflections from entering the image capture element.

11. The camera of claim 1, further comprising a radial mirror, said radial mirror surrounding said photochromic reflector, said radial mirror disposed to direct UV light onto said photochromic reflector.

12. The camera of claim 1, further comprising at least one heating element, said heating element configured and disposed to warm the housing and photochromic reflector.

13. The camera of claim 12, further comprising means for activating the at least one heating element when the ambient temperature falls below a predetermined value.

14. The camera of claim 12, wherein the means for activating the at least one heating element comprises a microcontroller and a temperature sensor, wherein the microcontroller is configured to read an ambient temperature value representative of the ambient temperature from the temperature sensor, and activate the at least one heating element when the temperature value is less than a predetermined threshold.

15. The camera of claim 14, further comprising a relative humidity sensor, and a barometric pressure sensor, wherein the microcontroller is further configured to read a relative humidity value representative of the ambient relative humidity from the relative humidity sensor, and read a barometric pressure value representative of the ambient barometric pressure from the barometric pressure sensor, and wherein said microcontroller is configured to compute a dew point temperature value based on the ambient temperature value, barometric pressure value, and relative humidity value, and activate said heating elements when the ambient temperature value is less than the dew point temperature value.

16. A camera for acquiring a 360 degree panoramic image, the camera comprising:
    a photochromic housing;
    a top cover, said top cover disposed at a first end of said photochromic housing;
    a photochromic reflector, said photochromic reflector disposed with said photochromic housing, below said top cover; an image capture element, said image capture element disposed at a second end of said photochromic housing;
    a radial mirror, said radial mirror surrounding said photochromic reflector, said radial mirror disposed to direct UV light onto said photochromic reflector;
    a plurality of sensor modules disposed around the exterior of the camera; and
    a plurality of ultraviolet light sources disposed around the exterior of the camera, wherein each ultraviolet light source corresponds to a sensor module, and each ultraviolet light source is configured to illuminate the photochromic reflector and photochromic housing upon activation of the corresponding sensor module.

17. The camera of claim 16, further comprising at least one heating element, said heating element configured and disposed to warm the photochromic housing and photochromic reflector.

* * * * *